United States Patent [19]

Papazian

[11] Patent Number: 4,488,105
[45] Date of Patent: Dec. 11, 1984

[54] STARTING CIRCUIT FOR ALTERNATOR OF AN AUTOMOTIVE VEHICLE

[75] Inventor: Samuel Papazian, Decines, France

[73] Assignee: Societe de Paris et du Rhone, Lyons, France

[21] Appl. No.: 401,353

[22] Filed: Jul. 23, 1982

[30] Foreign Application Priority Data

Jul. 31, 1981 [FR] France ............................... 81 15227

[51] Int. Cl.$^3$ .............................................. H02J 7/14
[52] U.S. Cl. ...................................... 320/64; 322/28; 322/99
[58] Field of Search ............... 322/60, 28, 99; 320/64, 320/68

[56] References Cited

U.S. PATENT DOCUMENTS

| | | | |
|---|---|---|---|
| 3,593,102 | 7/1971 | Kawashima et al. | 322/60 X |
| 4,087,736 | 5/1978 | Mori et al. | 322/60 X |
| 4,362,983 | 12/1982 | Mori et al. | 322/60 X |

Primary Examiner—R. J. Hickey
Attorney, Agent, or Firm—Browdy & Neimark

[57] ABSTRACT

A starting circuit, intended for an alternator with auxiliary rectification bridge feeding a regulator that controls the excitation winding by a transistor, while a warning light is connected in series with the contact key, makes it possible to have a high excitation current, as soon as the key is turned on for starting the engine. For this purpose, a stabilized power supply is connected by a diode to a point (A) located between the warning light and a transistor for control of the latter from a comparator; this point (A) is connected by a resistor to the auxiliary terminal (+A) of the alternator, which is connected by another resistor to the base of the transistor for controlling the excitation winding which is connected between the main terminals of the alternator. The base of this transistor is also connected to the regulating comparator fed by said stabilized power supply.

8 Claims, 2 Drawing Figures

STARTING CIRCUIT FOR ALTERNATOR OF AN AUTOMOTIVE VEHICLE

FIELD OF THE INVENTION

This invention relates to a starting circuit for an alternator of an automotive vehicle, and more particularly to an alternator with auxiliary rectification, having a 9-diode rectification bridge if a three-phase alternator is involved, associated with a voltage regulator with a warning light.

DESCRIPTION OF THE PRIOR ART

Figure 1:
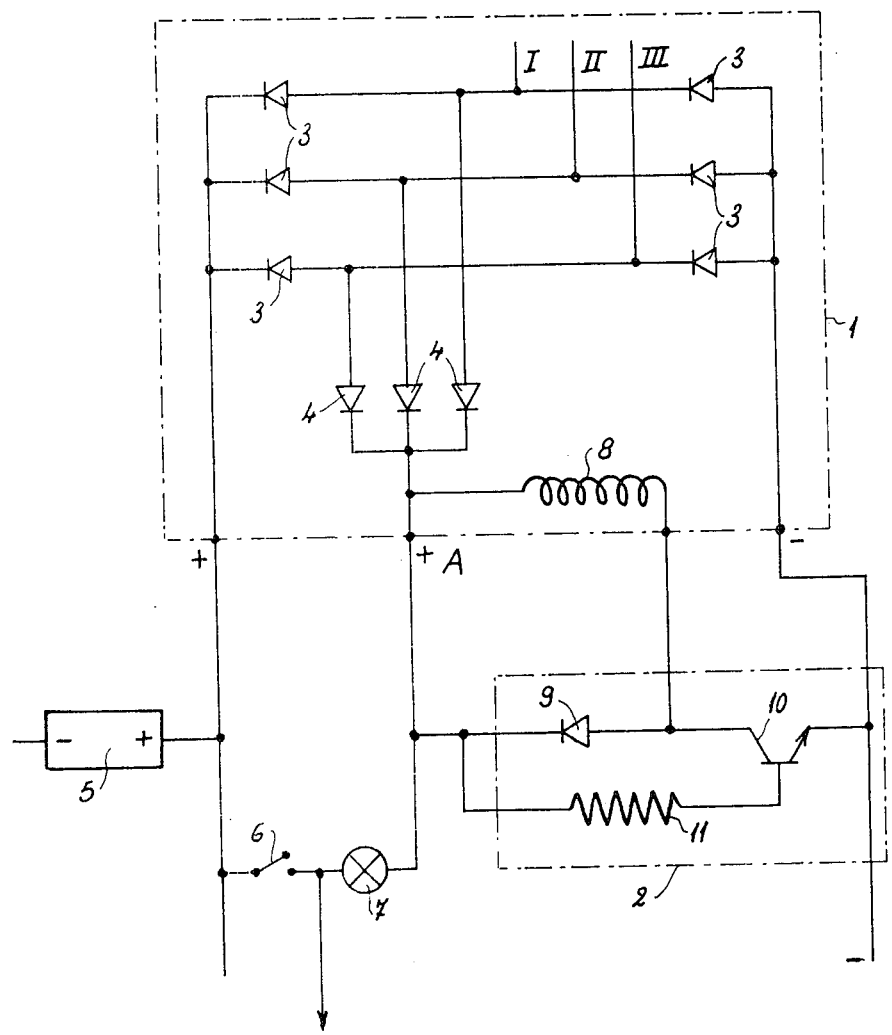
FIG. 1 illustrates the usual prior art circuit for an alternator with auxiliary rectification and voltage regulator.

FIG. 1 of the accompanying drawing illustrates the usual prior art circuit for such an alternator with auxiliary rectification 1, associated with a regulator 2. The three phases I, II, and III of the alternator are connected to six diodes 3 constituting the main rectification bridge, connected between the main plus terminal and minus terminal (or ground). Three other diodes 4 constitute the auxiliary rectification bridge, connected to an auxiliary plus terminal designated by +A. The main plus terminal is connected to terminal of the same sign of battery 5, and to the ignition key switch 6 which is connected in series with warning light 7, on a circuit branch connected to terminal +A. Excitation winding 8 has one of its terminal connected to terminal +A. Regulator 2 is connected between terminal +A and the ground; it comprises a protective diode 9 in series with a power transistor (or Darlington amplifier or other power control means) 10, whose base is connected to terminal +A by a resistor 11. The second terminal of excitation winding 8 is connected to a point located between diode 9 and transistor (or Darlington amplifier) 10.

In the case of the standard circuit just discussed when the engine is stopped and if key 6 has its contact closed, warning light 7 is lit by the passage of an electric current going through key 6, light 7, excitation winding 8 and transistor (or Darlington amplifier or other power control means) 10. Under these conditions and during the engine starting phase, the current going through excitation winding 8 is limited in strength by the resistance of warning light 7 in series with this excitation winding. Consequently, during this engine starting phase, since the strength of the excitation current remains too weak, it is necessary to wait for a certain rotation speed of the engine before the alternator can delivery a voltage corresponding to the rated characteristics of the electric system to be fed.

SUMMARY OF THE INVENTION

This invention aims at remedying the problem of the prior art starting circuit just described by providing an improvement that makes it possible to have a high excitation current, as soon as the contact key (ignition switch) is turned on and at the beginning of the starting operation, without basically modifying the electric circuit of the alternator having auxiliary rectification, or the contact key and warning light, and therefore keeping the simplicity of the usual wiring for the type of alternator under consideration, and also enabling the warning light to signal at least all the failure it usually indicates.

For this purpose, the invention has as its object a starting circuit for an alternator with auxiliary rectification, which supplies an auxiliary voltage that feeds a regulator controlling the excitation of the alternator by a transistor (or Darlington amplifier) while a warning light is connected in series with the contact key. The starting circuit of the invention comprises a stabilized power supply connected by a diode to a point located between the warning light and a transistor controlling the latter from a comparator, the said point also being connected by a resistor to the auxiliary terminal of the alternator, which is connected by another resistor to the base of the excitation control transistor (or Darlington amplifier) which is connected between the main terminals of the alternator, a base also being connected to a regulating comparator fed by said stabilized power supply.

This stabilized power supply and the comparators and transistors or the like form an electronic unit which can employ the technique of integrated circuits, which the branches outside this unit remain hardly modified in comparison with the known layout mentioned above. It suffices to connect one of the terminals of the excitation winding to the main plus terminal instead of to the auxiliary plus terminal of the alternator, and to eliminate the direct connection between the warning light and the auxiliary plus terminal. The excitation winding is no longer connected in series with the resistance of the warning light and, when the contact key is turned on and the engine started, the path of the current is different than in the prior art circuit of FIG. 1. thus, in the improved circuit of FIG. 2, the stabilized power supply supplies to the point located between the warning light and its control transistor a voltage that makes it possible, by the two resistors connected to the auxiliary plus terminal, to saturate the transistor (or Darlington amplifier) associated with the excitation winding. This latter, connected between the main terminals of the alternator, or generally between the main plus terminal and ground, then has a current passing through it whose strength is no longer reduced because of the resistance of the warning light, so that the alternator very quickly delivers a current under a sufficiently high voltage, without waiting for the engine, and hense the alternator driven by the engine, to reach a considerable rotating speed. After starting of the alternator, the excitation current is regulated by the corresponding comparator and transistor (or Darlington amplifier).

DESCRIPTION OF THE PREFERRED EMBODIMENT

Figure 2:
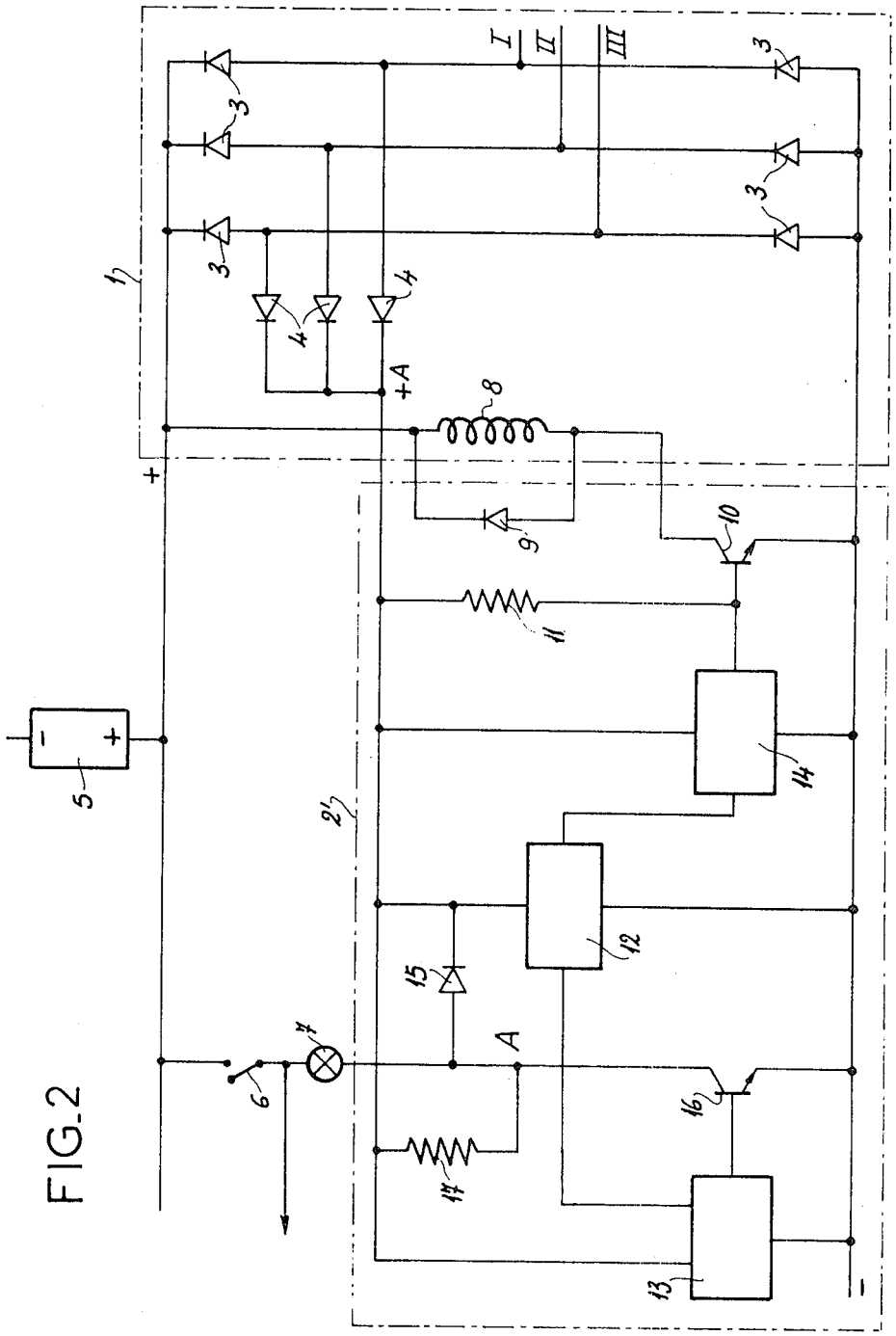
FIG. 2 illustrates an alternator starting circuit in accordance with the present invention.

The invention will be better understood by the following description, with reference to FIG. 2 of the accompanying drawing showing, in principle, an embodiment of an alternator starting circuit according to the invention.

In the diagram of FIG. 2, the same reference numerals 1 and 3 to 11 as in FIG. 1 designate the corresponding parts, in particular: the alternator with its main and auxiliary rectification bridges and its excitation winding and the contact key in series with the warning light. Reference 2' here designates the regulator in the broad sense, including the starting circuit more particularly constituting the object of the invention. Regulator 2' comprises a power transistor (or Darlington amplifier) 10 connected in series with excitation winding 8 and having its base connected to terminal +A by a resistor 11. A difference in comparison with the prior art circuit of FIG. 1 resides in the fact that excitation winding 8 and protective diode 9 are not connected to auxiliary plus terminal +A but instead to the main plus terminal.

A stabilized power supply 12, a comparator 13 for controlling warning light 7, and another regulating comparator 14 are connected, between terminal +A and the ground, in part 2' "regulator+starting circuit". Warning light 7 is connected, by a diode 15, to the stabilized power supply 12, and connected in series with a transistor 16 whose base is connected to the output of comparator 13. A point A, located between warning light 7 and transistor 16, is connected by a resistor 17 to terminal +A. The output of comparator 14 is connected to the base of the transistor (or Darlington amplifier) 10, which is also connected by a resistor 11 to terminal +A as already indicated.

At the moment the contact of the key switch 6 is turned on, alternator 1 still being stopped, stabilized power supply 12 in turned on through warning light 7 and diode 15, which makes it possible to obtain sufficient voltage at point A to saturate the transistor (or Darlington amplifier) 10, the base current of which is stabilized through resistors 17 and 11 (element 10 having to have a sufficient gain to open to the voltage that then controls it). Excitation winding 8 is then supplied directly by the voltage of battery 5, and a current of determined maximal strength goes through it.

Warning light 7 initially remains lit, comparator 13 detecting on terminal +A a voltage less than the reference value and making transistor 16 conductive.

With alternator 1 starting to turn, the voltage at terminal +A increases and, when this voltage becomes greater than that previously maintained at point A by the stabilized power supply 12, this stabilized power supply directly receives voltage from terminal +A. Comparator 14, fed by stabilized power supply 12, regulates the excitation current going through winding 8, by transistor (or Darlington amplifier) 10, in a way known per se.

Exceeding of the reference value by the voltage on terminal +A causes warning light 7 to go out, whose control transistor 16 is blocked by comparator 13.

If the voltage of the auxiliary plus terminal +A drops excessively, the functioning described above also makes restarting of alternator 1 possible.

Of course, the invention is not limited to the sole embodiment of this starting circuit for an alternator which was described above by way of example; rather, it takes in all variants based on the same principle, regardless of the details of design and applications. In particular, the three units—stabilized power supply 12, control comparator 13 of the warning light and regulating comparator 14—shown separately for explanation of the various functions of circuit 2', can be part of a single integrated circuit. The details of control of warning light 7, with lighting and turn-off thresholds which are more or less numerous as a function of the complexity of comparator 13, can also be modified without going outside the scope of the invention.

I claim:

1. A starting circuit for an automobile having an alternator; said alternator comprising auxiliary rectification means, a main terminal, an auxiliary terminal, and excitation coil means; said starting circuit comprising regulator means, a battery, an ignition key switch, a warning light means, and circuit means connecting said battery said ignition switch and said warning light into a series circuit with each other; said regulator means comprising power control means in series circuit with said alternator excitation coil means, said regulator means comprising stabilized power supply means and circuit means including a diode connecting said warning light series circuit to the input of said stabilized power supply means, circuit means including a resistor connecting said alternator auxiliary power terminal to the input of said stabilized power supply via a point in said previously mentioned diode and warning light series circuit, said regulator means also comprising regulating comparator means and warning light comparator means, circuit means connecting said alternator auxiliary terminal to one input of said warning light comparator means, circuit means supplying a first output of said stabilized power supply to a second input of said warning light comparator means, said warning light comparator means producing an output when the voltage at said alternator auxiliary terminal exceeds the voltage of said first output of said stabilized power supply, said warning light comparator means comprising a transistor, circuit means connecting the base of said transistor to the output of said warning light comparator means and connecting the remaining terminals of said transistor in series circuit with said ignition switch and warning light series circuit, circuit means connecting one input of said regulating comparator means to a second output of said stabilized power supply and another input of said regulating comparator means to said alternator auxiliary terminal, said regulating comparator means producing an output when the voltage of said second output of said stabilized power supply is greater than the voltage at said alternator auxiliary terminal, circuit means connecting the output of said regulating comparator means to control said power control means for said alternator excitation means, and circuit means including a resistor connecting said alternator auxiliary terminal to said previously mentioned circuit means between said regulating comparator means and said power control means.

2. The circuit of claim 1, wherein said power control means comprises a power transistor.

3. The circuit of claim 1, wherein said power control means comprises a Darlington amplifier.

4. The circuit of claim 1, wherein said stabilized power supply, said warning light comparator means and said regulating comparator means are all built into a single integrated circuit.

5. A regulator for an automotive alternator, said alternator being of the type having main and auxiliary terminals and excitation coil means, said regulator including power control means to activate said excitation coil means at a relatively high power level even before said alternator outputs is full power, said last mentioned means comprising an arrangement of a stabilized power supply, regulating comparator means and warning light comparator means, means to sense the voltage at said auxiliary terminal of said alternator and to provide said voltage as a first input to both of said comparator means, means to feed first and second output voltages from said stabilized power supply means as a second input to said warning light and said regulating comparator means respectively, said warning light comparator means including a transistor arranged in series circuit with the ignition switch and warning light of the control circuit associated with said vehicle, the output of said regulating comparator means providing a control signal to said power control means for said alternator excitation coil means, and each of said comparator means operating to produce its output when the voltage it receives from said stabilized power supply is greater than the voltage at said auxiliary terminal of said alternator, whereby full power from the vehicle battery is provided across said excitation coil immediately upon activation of the ignition key switch, and said warning light comparator extinguishes said warning light after said voltage at said alternator auxiliary terminal exceeds said first output voltage of said stabilized power supply.

6. The circuit of claim 5, wherein said power control means comprises a power transistor.

7. The circuit of claim 5, wherein said power control means comprises a Darlington amplifier.

8. The circuit of claim 5, wherein said stabilized power supply, said warning light comparator means and said regulating comparator means are all built into a single integrated circuit.

* * * * *